United States Patent [19]
Michell

[11] Patent Number: 5,647,420
[45] Date of Patent: Jul. 15, 1997

[54] CANTILEVERED LINEAR HAND-HELD POWER TOOL ATTACHMENT APPARATUS

[76] Inventor: Steven Michell, Box 488, Canoe, B. C., Canada, V0E 1K0

[21] Appl. No.: 542,471

[22] Filed: Oct. 5, 1995

[51] Int. Cl.⁶ .................. B26D 5/08; B25H 1/04
[52] U.S. Cl. .................. 144/286.1; 144/286.5; 144/253.1; 83/471.3; 83/468.3; 83/468; 83/477.2; 83/522.11; 83/574
[58] Field of Search .................. 83/468, 468.3, 83/468.4, 467.1, 471.3, 477.2, 486.1, 520, 522.11, 574; 409/130, 180, 182; 144/253.1, 286.1, 286.5

[56] References Cited

U.S. PATENT DOCUMENTS

| | | | |
|---|---|---|---|
| 4,105,055 | 8/1978 | Brenta | 144/286.1 |
| 4,155,383 | 5/1979 | Welliver | 83/574 |
| 4,494,431 | 1/1985 | Niswonger | 83/471.3 |
| 4,807,506 | 2/1989 | Audet | 144/286.1 |
| 4,890,657 | 1/1990 | Shelhorse | 83/574 |
| 4,957,024 | 9/1990 | Albrecht | 83/574 |
| 4,995,288 | 2/1991 | Della Polla | 83/574 |
| 5,165,317 | 11/1992 | Findlay | 83/574 |

*Primary Examiner*—W. Donald Bray
*Attorney, Agent, or Firm*—Antony C. Edwards

[57] ABSTRACT

A cantilevered hand-held power tool attachment device for releasably mounting hand-held power tools in an elevated upright position over a base, has a base, and mounted to the base, means for selectively adjustably elevating and lowering the pair of laterally opposed cantilevered support arms extending longitudinally over the base, a power tool carriage slidably mounted between the pair of laterally opposed cantilevered support arms and selectively slidably lockably positionable in a longitudinal direction along the pair of laterally opposed cantilever support arms, and the power tool carriage adapted to releasably lockably mate a hand-held power tool in releasably mountable vertical engagement thereon.

31 Claims, 10 Drawing Sheets

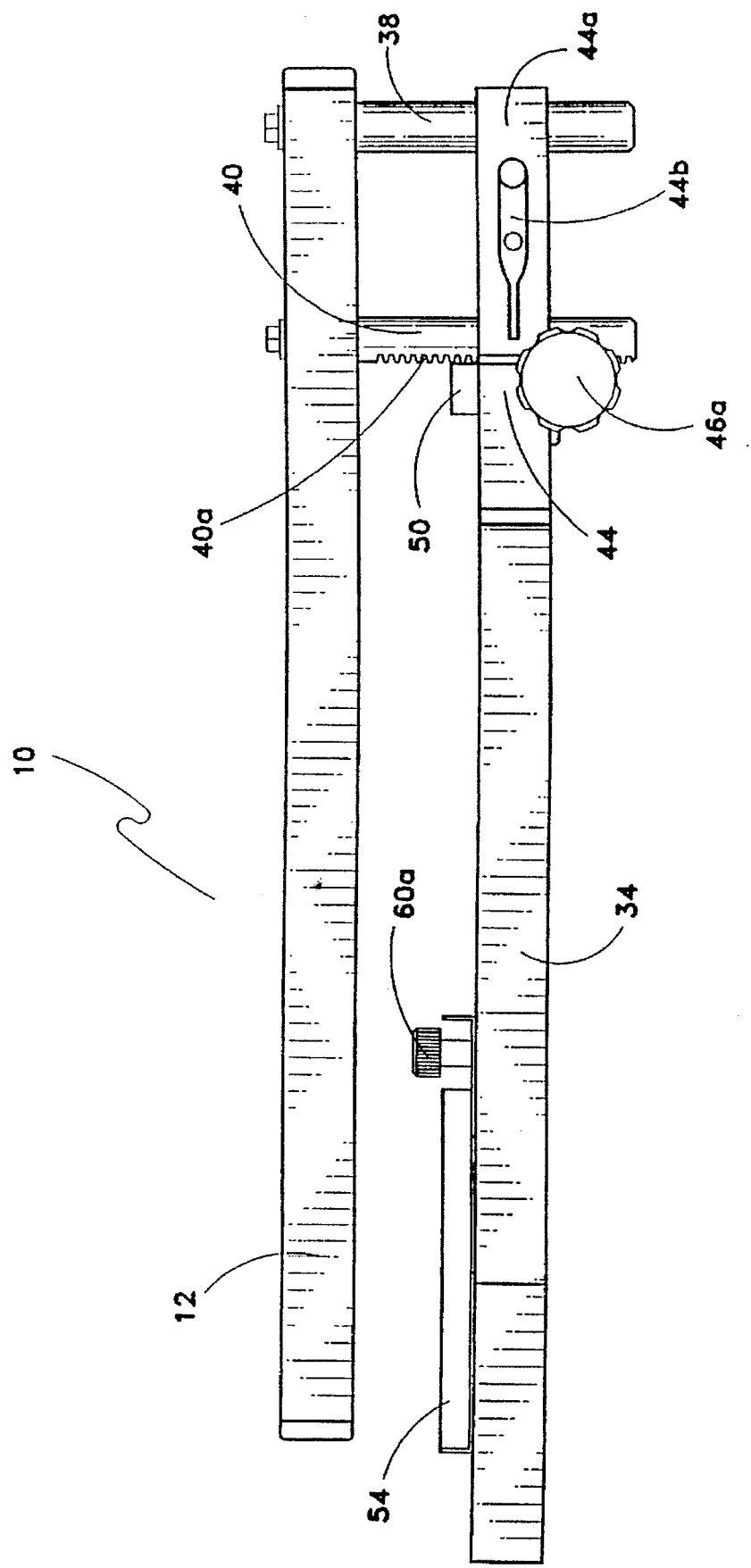

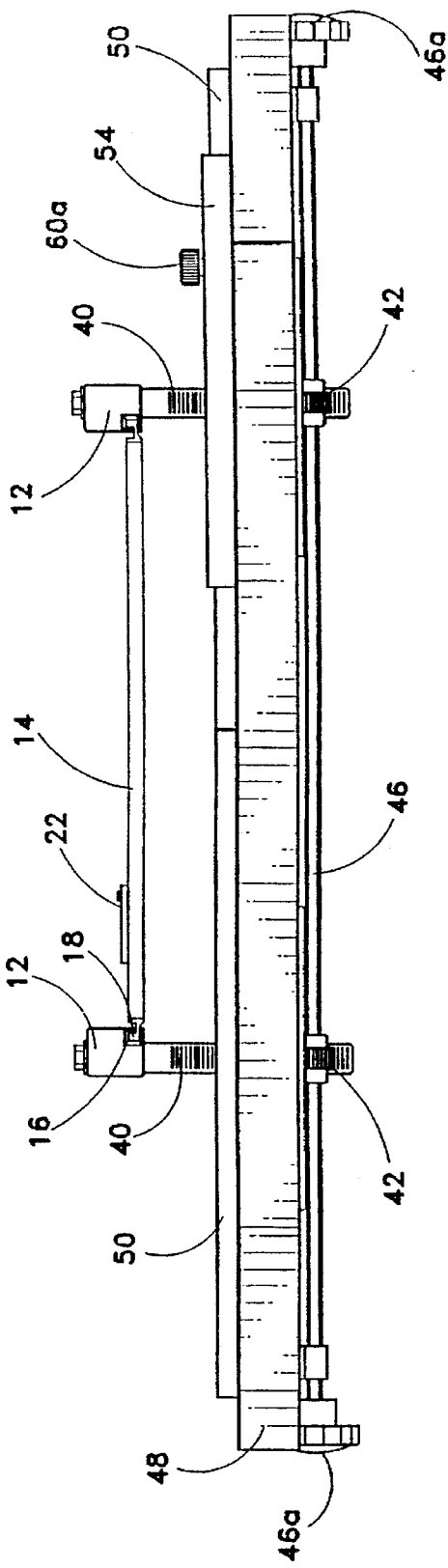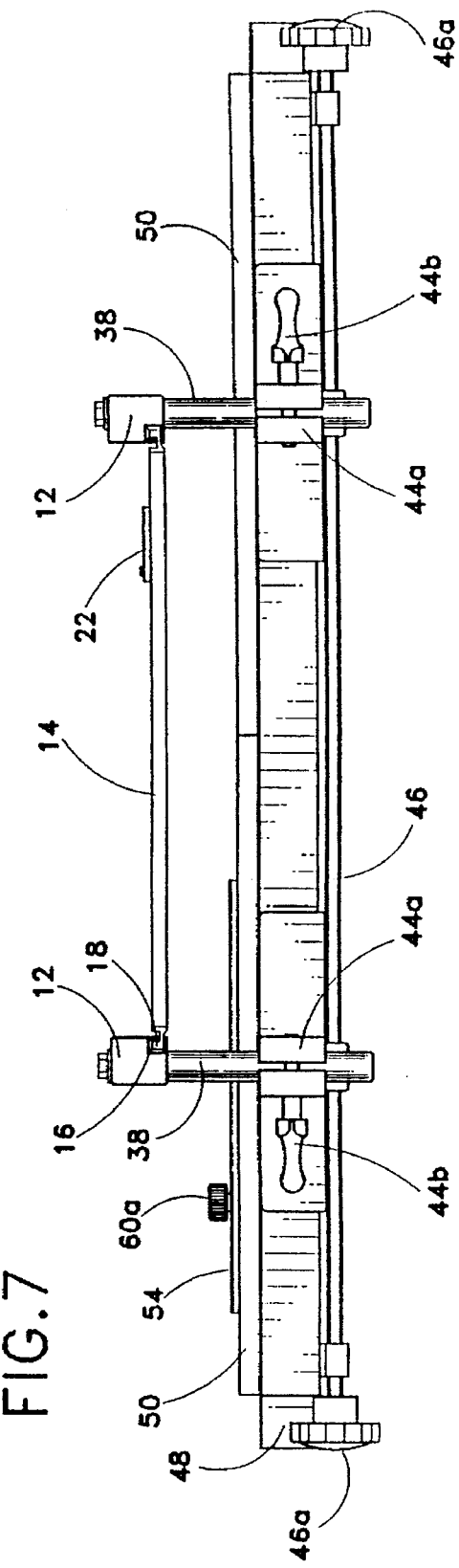

CANTILEVERED LINEAR HAND-HELD POWER TOOL ATTACHMENT APPARATUS

FIELD OF THE INVENTION

This invention relates to the field of work tables or work benches adapted to accommodate power tools thereon, or to table mountable power tools generally, and in particular, to devices for adapting hand-held power tools for mounting onto work tables or work benches for use in the manner of table mounted power tools.

BACKGROUND OF THE INVENTION

In the prior art applicant is aware of U.S. Pat. No. 5,090,283 which issued to Noble on Feb. 25, 1992, for a Saw Table. The Saw Table of Noble teaches mounting a hand-held circular saw by means of its sole plate onto an elevated track supported at either end of the elevated track over a work surface. The hand-held saw is mounted in a carriage which slides along the length of the elevated track.

Similarly, U.S. Pat. No. 4,972,748 which issued Nov. 27, 1990, to Walsh for a Portable Table for Circular Saw and Other Power Tools, discloses a portable table for use with a circular saw and other power tools, wherein the power tools are mountable onto a power tool support slidable mounted between parallel elevated guide rails. The elevated guide rails are supported at opposed ends of the guide rail over the base of the portable table.

Compared with all earlier known apparatus of the general type, because the hand-held power tool attachment mechanism of the present invention is cantilevered over the work table, the present invention provides, firstly, user access for placing a work-piece directly in front and below a power tool's blade path, when desired, and without having to feed the work-piece under the support arms from the sides for simple cut-off operations. Secondly, the apparatus adapts a wider variety of sizes of hand-held power tools, than that of other known power tool attachment devices and also attaches left handed circular saws. Thirdly, the apparatus of the present invention may be easily dismantled for storage or transportation, by having its components, namely, the cylindrical uprights, the support arms and the carriage collectively removable from the base work-table. Fourthly, additional hand-held power tool carriages are quickly and easily interchangeable as each power tool may remain mounted on its own separate carriage. Fifthly, the present invention allows for cross-cuts of 90 degrees, on a straight split fence, and a mitre cut at most desired angles on an adjustable mitre fence, concurrently and without changing settings or making any adjustments. Sixthly, the present invention holds the work-piece in place on 3 sides, thereby appreciably reducing the chance of kick-back and allowing more control over the work-piece. Finally, the apparatus provides a sighting device which improves the accuracy of each circular saw cut.

Consequently, it is an object of the invention to produce an apparatus where the work-piece can be placed under a cantilevered power tool directly from the front or from the sides of the work bench. It is another object of the invention to allow for cross-cuts of 90 degrees, on a straight split fence, and a mitre cut, set at most any commonly desired angle, on an adjustable mitre fence, concurrently, without making any changes or adjustments. It is another object of the invention to produce an apparatus wherein it is less likely that a hand or finger will contact the bit or blade of the power tool. It is another object of the invention to produce an apparatus wherein there is a sighting device for easier positioning of the work-piece thereby allowing for greater precision. It is yet another object of the invention to produce an apparatus wherein the work-piece can be held in place on 3 sides at all times, thereby appreciably reducing the chance of kick-back and also allowing more control over the work-piece and with smoother results. It is also the object of the invention to produce an apparatus which can be easily collapsed for ease of transportation or storage.

SUMMARY OF THE INVENTION

In summary, a multiple use apparatus for hand-held power tools, including but not limited to, hand-held circular saws, routers and jigsaws, that comprises of a hand-held power tool carriage, movable linearly along a pair of support arms and with the ability to move vertically above the base work-table and touching the top of the work-piece, the support arms are cantilevered by a pair of cylindrical uprights on the rear portion of each support arm, which in turn are supported by a pair of base support clamps and a base work-table; including means for rotationally positioning the hand-held power tool carriage at 90 degree intervals to the support arms; the hand-held power tool carriage having adjustable clamps for attaching the hand-held power tools in an upright position, with the working member of the hand-held power tools extending below the carriage and above the base work-table.

The invention provides a pair of support arms cantilevered above a base work-table, with means for permitting manual linear sliding of a hand-held power tool carriage linearly along the support arms, including the ability to adjustably fix the carriage along the support arms. The carriage is rotationally positionable at 90 degree intervals relative to the support arms. There is means for vertical adjustment of the support arms, and thus the carriage, so as to maintain the support arms substantially parallel to the base work-table. To this end a pair of cylindrical uprights are provided, one in front of the other, on the bottom and at the rear of each arm. The front set of cylindrical uprights have teeth on their front quadrant which mesh with a pair of pinion gears within each of a pair of base support clamps. The pinion gears are fixed to an elevation rod which runs through the pinion gears, the base clamps and the lower rear of the base work-table. There are provided elevation knobs on both the left and right ends of the elevation rod for access s from either side of the base work-table.

Additionally, the base support clamps provide a clamping means, around the cylindrical uprights, to selectively adjust the height of the support arms relative to the base work-table and yet to allow for fine adjustment of the support arms to fit down on to an uneven work-piece and to improve the rigidity of the apparatus and thus the accuracy of the cut.

Also the invention provides a pair of adjustable sighting wires, on the carriage, positioned over the centers of two round holes on two opposing sides of the carriage and in line with the circular saw's cutting blade, for the alignment of the edge of the circular saw cut line with the mark on the work-piece, for either ripping or cross-cutting.

Also the invention includes an adjustable mitre fence, which is selectively adjustable to various positions on the top of the base work-table. The mitre fence has close fitting downward protruding dowels and a threaded screw and wing nut arrangement, which can be both loosened and tightened allowing for quick adjustments of the angle of cut, and yet which provides positive tightening at any position of the mitre fence. There is also means for selectively adjusting the position of the mitre fence to pre-set angles by means of incremental detents at preset angles of, 45 degrees, 22 ½ degrees and 90 degrees.

There is also a movable fence used for ripping and cross-cutting wider work-pieces. It is movable about the rear or mid portion of the base work-table for optimum positioning.

Also the present invention includes a portable adjustable carriage guide attachment for use as a ripping and routing guide, used when the work-piece is too large to place on the base work-table.

BRIEF DESCRIPTION OF THE DRAWINGS

FIG. 5 is a right side elevation view of the linear hand-held power tool attachment apparatus;

FIG. 6 is a front elevation view of the linear hand-held power tool attachment apparatus;

FIG. 7 is a rear elevation view of the linear hand-held power tool attachment apparatus;

DETAILED DESCRIPTION OF THE PREFERRED EMBODIMENT

Figure 1:
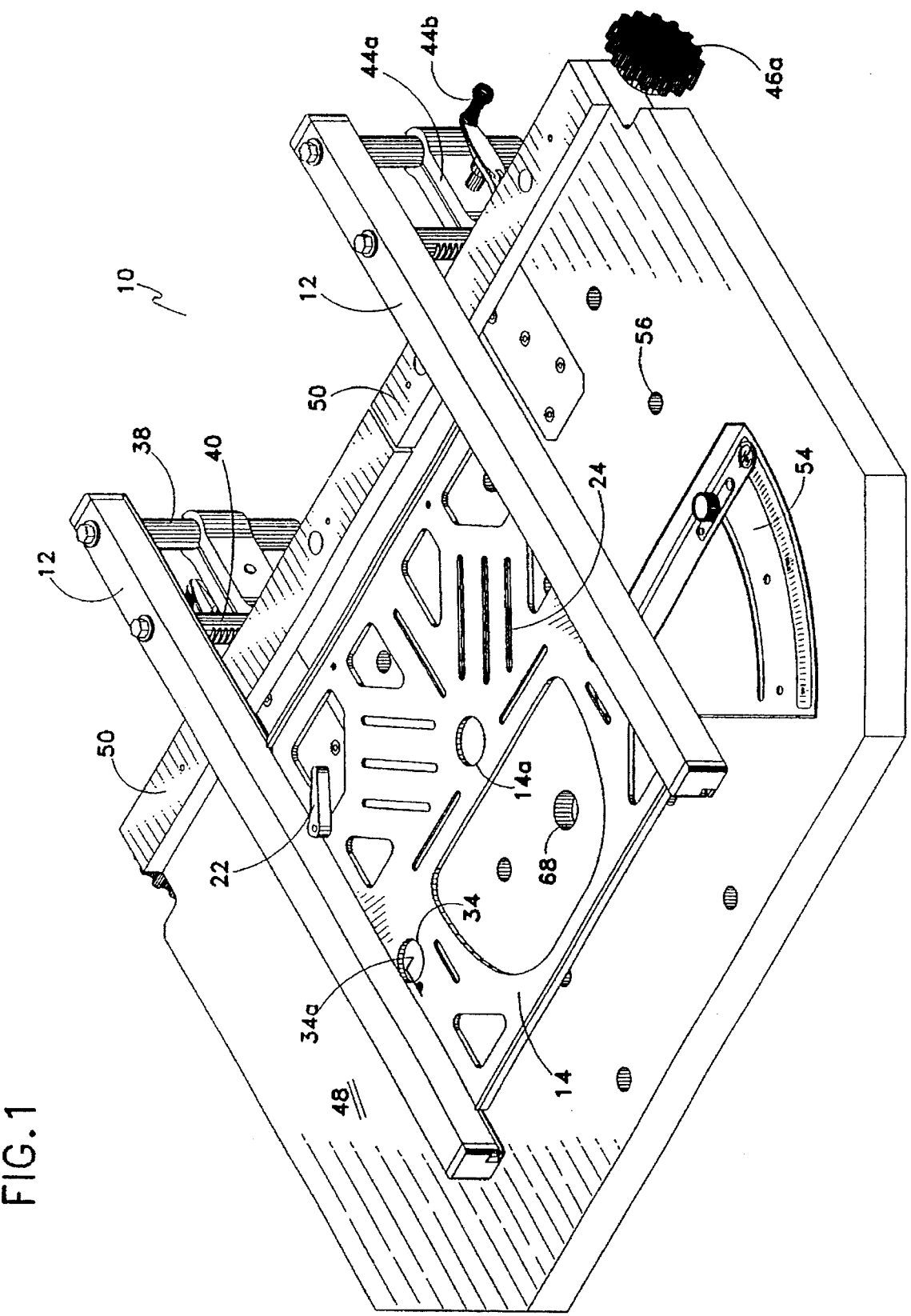
FIG. 1 is a perspective view of the linear overhead hand-held power tool attachment apparatus according to an embodiment of the invention.

With reference to the drawings, the apparatus is generally indicated by the reference numeral 10. Apparatus 10 includes a pair of support arms 12 with means for permitting manual sliding of the carriage 14 along the support arms 12. Carriage 14 slides along the support arms 12 in grooves or slots 16. The carriage 14 has a spline 18 that runs along all four sides of carriage 14 and slidingly interlocks with groove 16 in the sides of the support arms 12 in grooves or slots 16. The carriage 14 has chamfered corners 20, exposing the ends of the splines 18, to allow for horizontal rotational positioning of the carriage 14, at 90 degree intervals, when slid off the ends of the support arms 12, rotated (in increments of 90 degrees) and slid back on to the support arms 12.

The carriage 14 includes a clamping cam 22 to selectively adjust the position of carriage 14 along the support arms 12. The carriage 14 includes a plurality of elongated apertures 24, with recesses 26 on the carriage's bottom face 30, to allow the heads of carriage bolts 28 to remain flush with bottom face 30 of carriage 14. The carriage bolts 28 slide in the elongated apertures 24, and extend through carriage 14 so as to protrude from the top surface to releasably mate with clamps 32. As illustrated in FIGS. 14–18, clamps 32 include adjustable clamp cam levers 32a pivotable about pivot pins 32b so as to engage cam surface 32c with clamp arm 32d.

Figure 17:
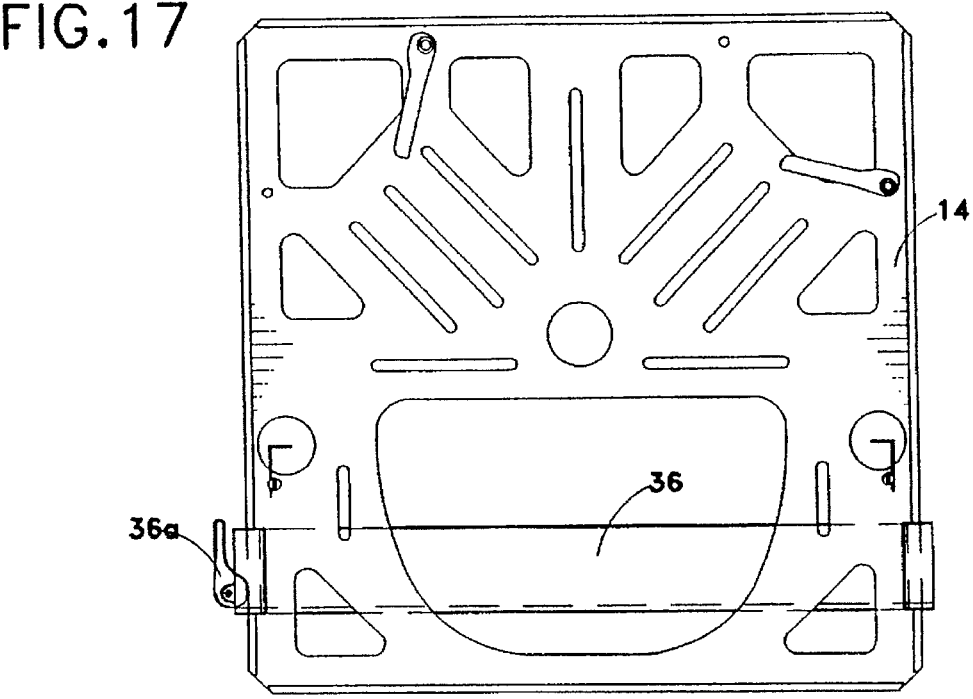
FIG. 17 is a top view of the carriage, showing the portable adjustable carriage guide attachment.
Figure 18:
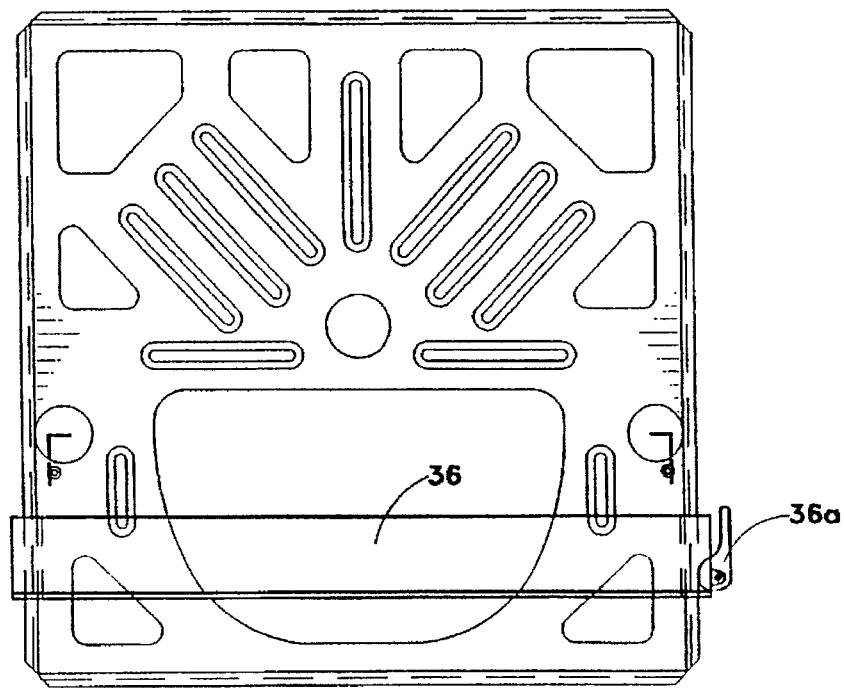
FIG. 18 is a bottom view of the carriage, showing the portable adjustable carriage guide attachment.
Figure 19:
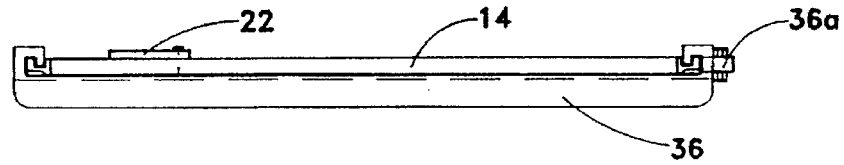
FIG. 19 is side a view of the carriage, showing the portable adjustable carriage guide attachment.

The carriage 14 includes a power tool bit receiving aperture 14a. The carriage 14 also includes an opposed pair of holes 34 with adjustable sight wires 34a that include adjusting screws 34b. As shown in FIGS. 17–19, the carriage 14 further includes a removable adjustable carriage guide attachment 36 with an adjustable guide cam lock 36a.

Figure 3:
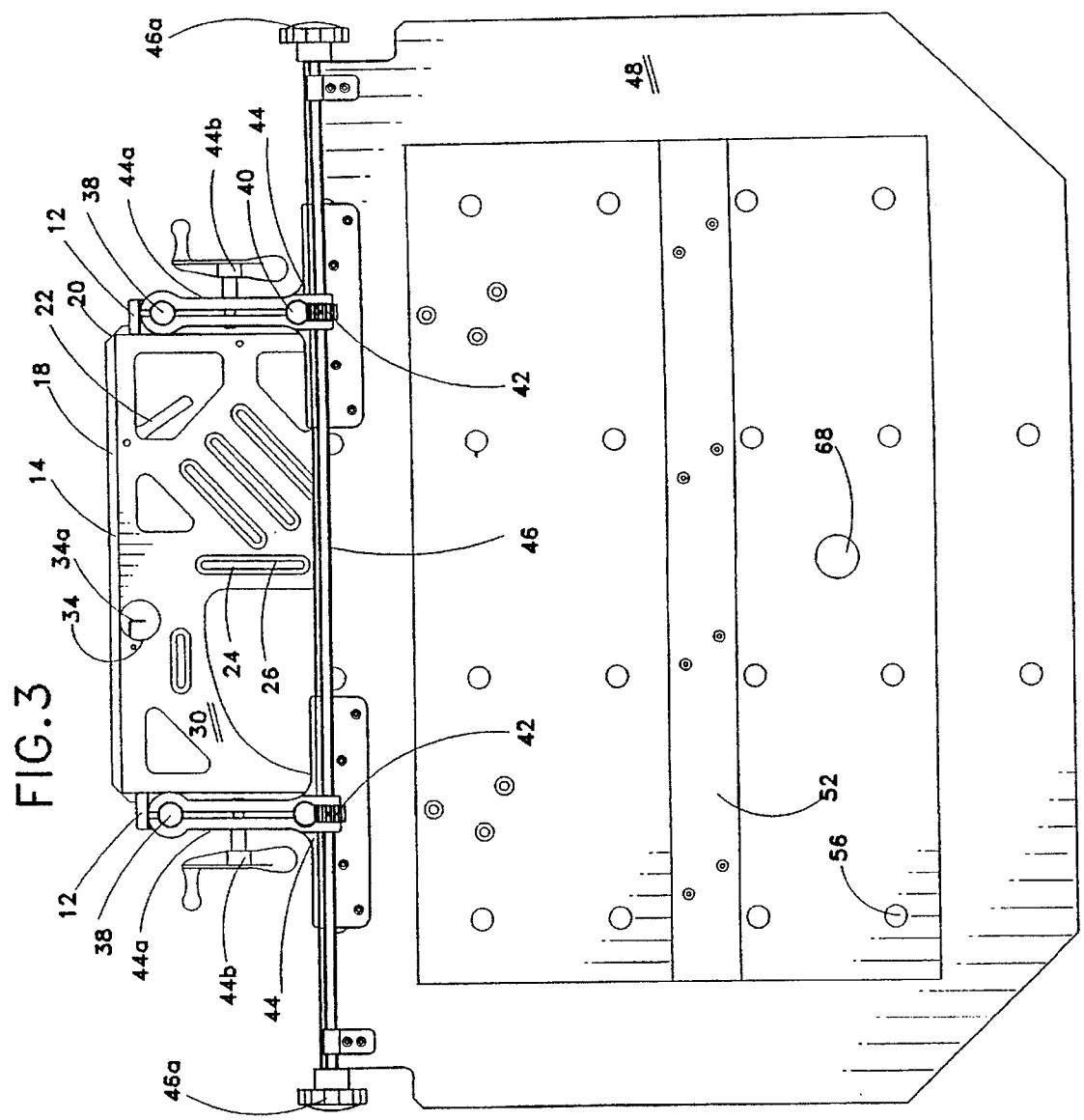
FIG. 3 is a bottom plan view of the linear hand-held power tool attachment apparatus.
Figure 4:
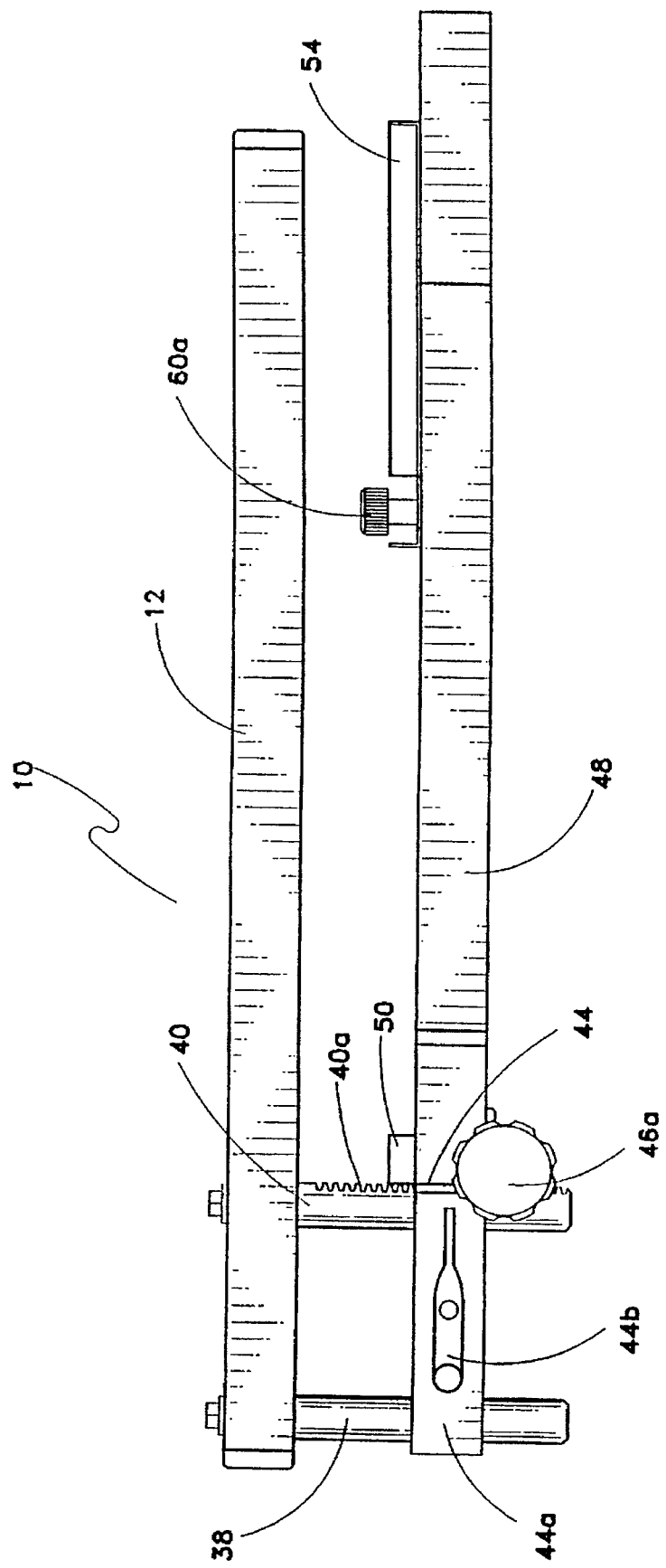
FIG. 4 is a left side elevation view of the linear hand-held power tool attachment apparatus.
Figure 8:
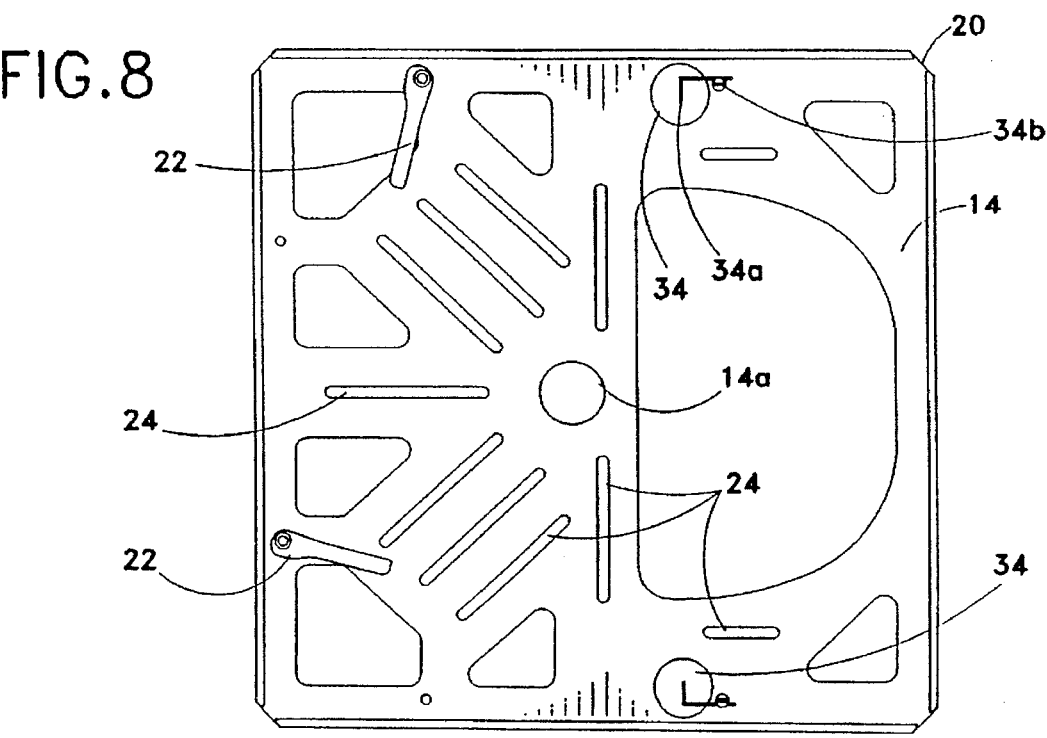
FIG. 8 is a top view of the carriage.
Figure 9:
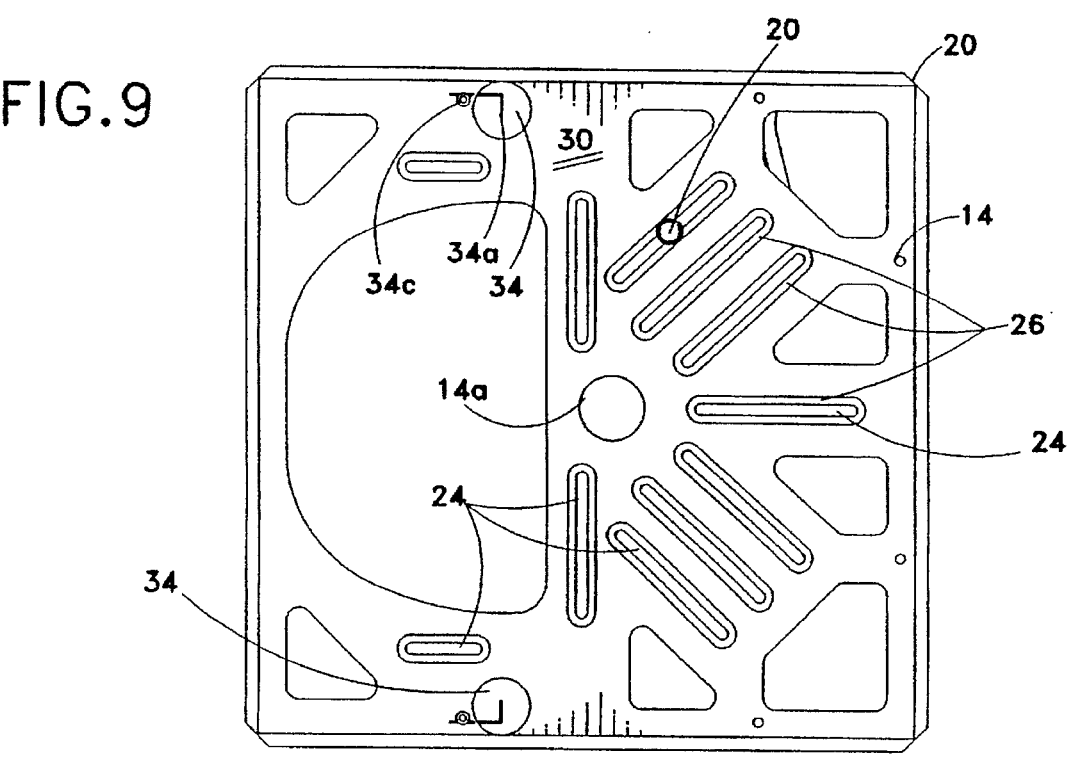
FIG. 9 is a bottom view of the carriage, including a carriage bolt.
Figure 10:
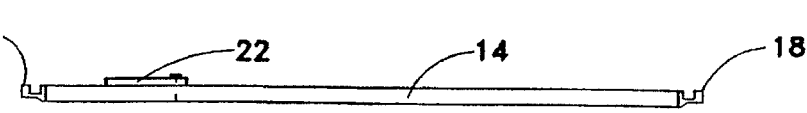
FIG. 10 is a side view of the carriage including the carriage bolts and cam action tool clamps.
Figure 11:
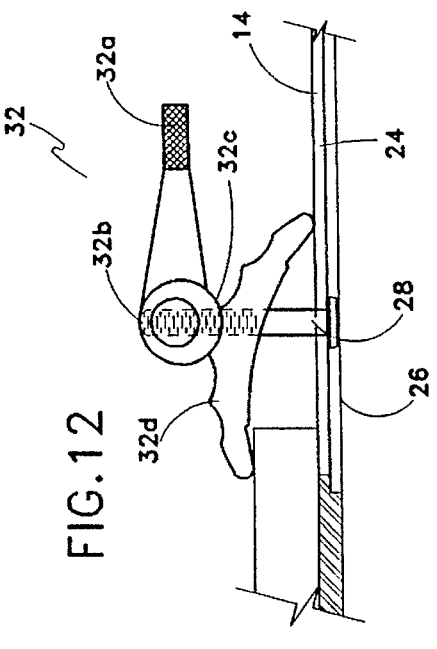
FIG. 11 is an enlarged side view of the cam action tool clamp, shown in the clamped position.
Figure 12:
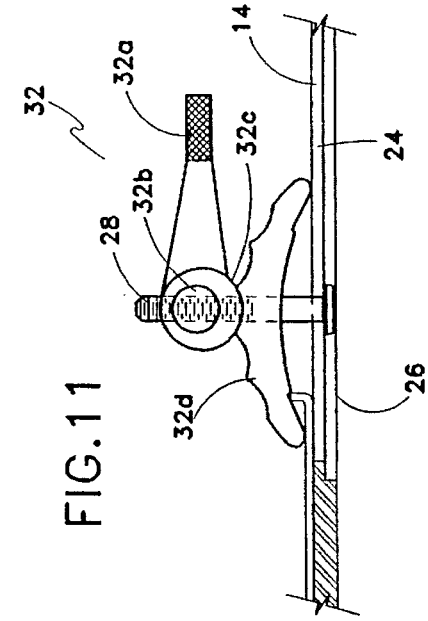
FIG. 12 is an enlarged side view of the cam action tool clamp, shown in a clamped position.
Figure 13:
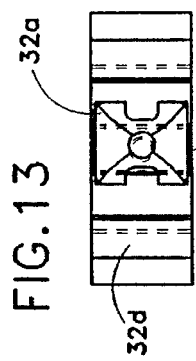
FIG. 13 is an enlarged top view of the cam action tool clamp, shown in the released position.
Figure 14:
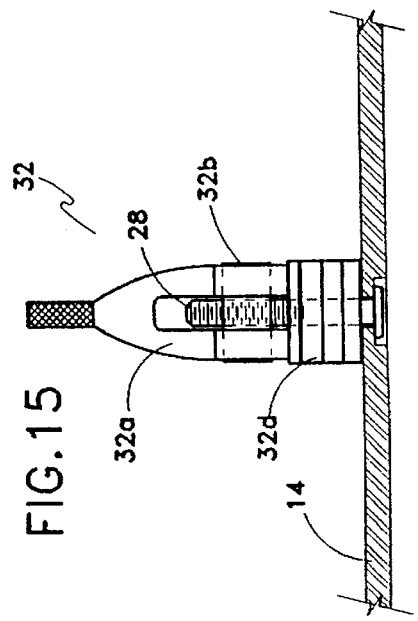
FIG. 14 is an enlarged front view of the cam action tool clamp, shown in the released position.
Figure 15:
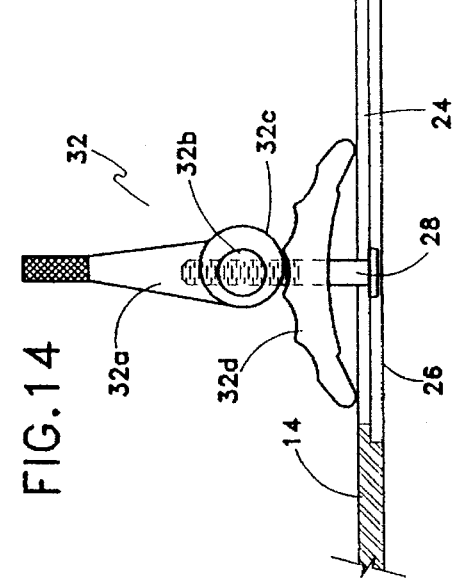
FIG. 15 is a an enlarged side view of the cam action tool clamp, shown in the released position.

As illustrated in FIGS. 4–7, there is provided a pair of cylindrical uprights 38 and 40 on each support arm 12. The uprights to the rear are rear cylindrical uprights 38. In the front of the rear cylindrical uprights 38 are the front cylindrical uprights 40. Uprights 38 and 40 allow vertical adjustment of the support arms 12 (and thus the carriage 14) relative to the base 48. The base 48 may be mounted on a conventional work-table, which may be a conventional work-table such as the Workmate™ manufactured by Black and Decker™, or conventional set of legs. The front cylindrical uprights 40 include teeth 40a on the front quadrant. Teeth 40a engage pinion gears 42 within base support clamps 44. As illustrated in FIGS. 3, 6 and 7, rod 46 is horizontally journalled through the pinion gears 42 and the lower rear of the base 48. Knobs 46a are attached to either end of elevation rod 46. Support clamps 44 provide clamping arms 44a. Clamping handles 44b are journalled in clamping arms 44a to releasably tighten clamping arms 44a on cylindrical uprights 38 and 40.

Figure 2:
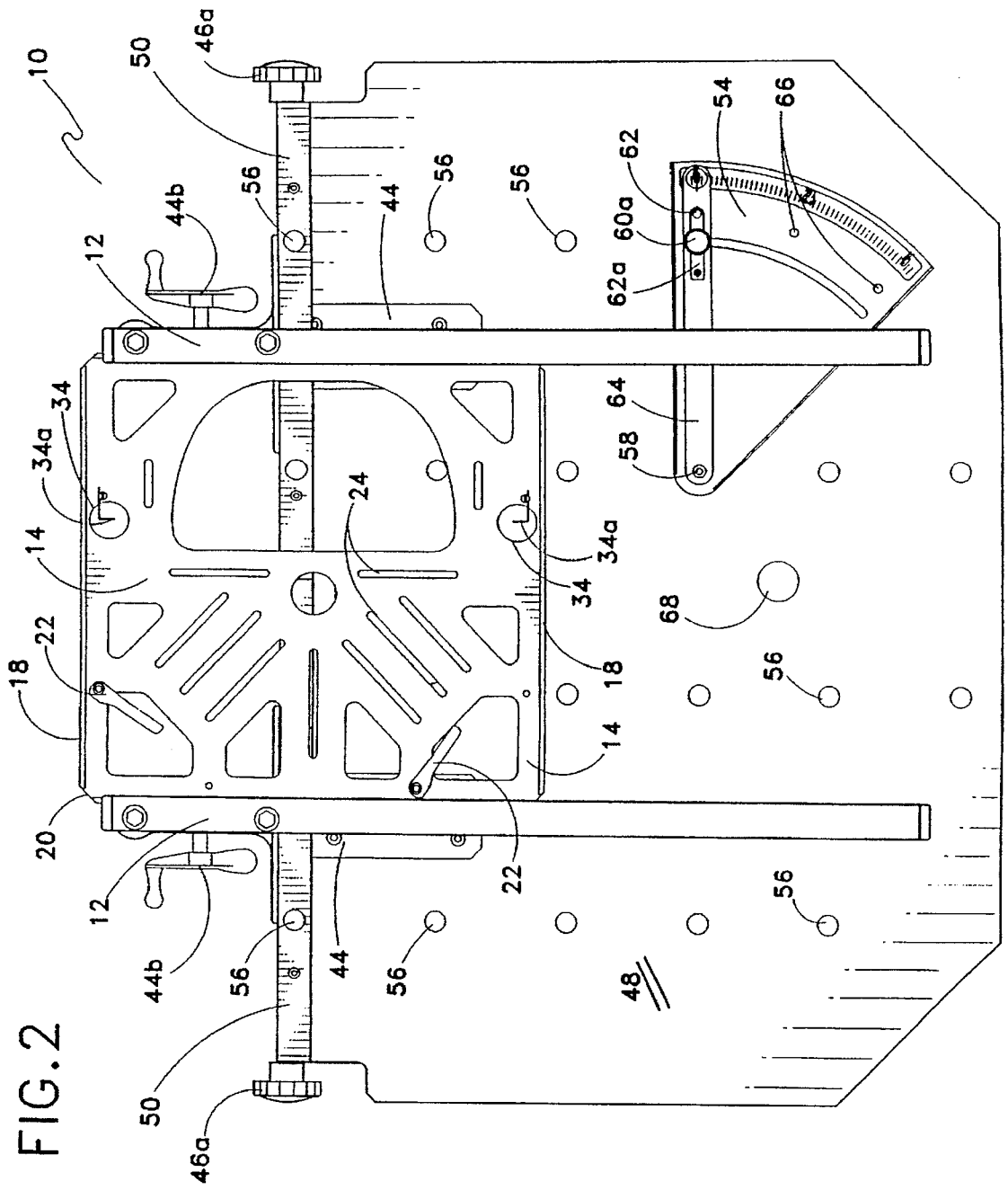
FIG. 2 is a top plan view of the linear hand-held power tool attachment apparatus.

As seen in FIGS. 2, 6 and 7, split fence 50 is releasably and adjustably mountable onto the top surface of base 48 by means of dowels (not shown). Mounted on the bottom surface of base 48, and extending downwards therefrom is a cross member 52 (see FIG. 3) for releasable mounting of apparatus 10 onto a conventional work-table.

Figure 16:
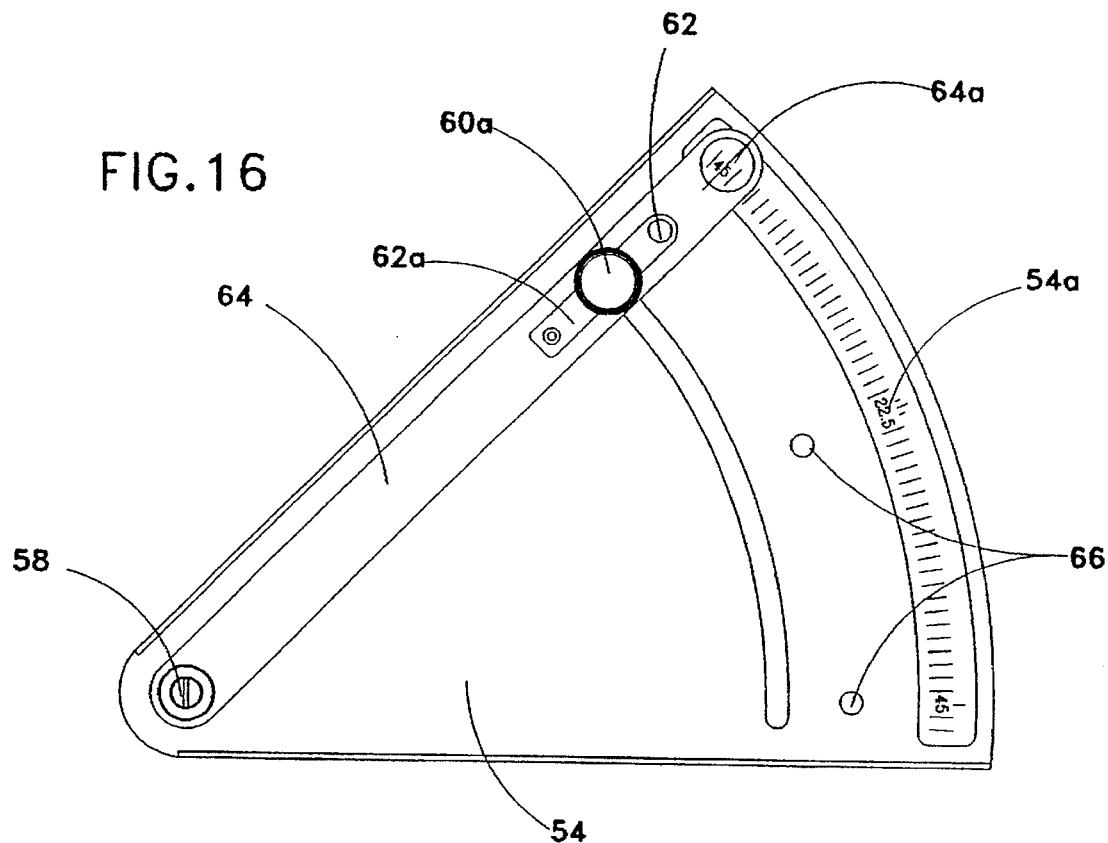
FIG. 16 is a top view of the mitre fence.
Figure 16A:
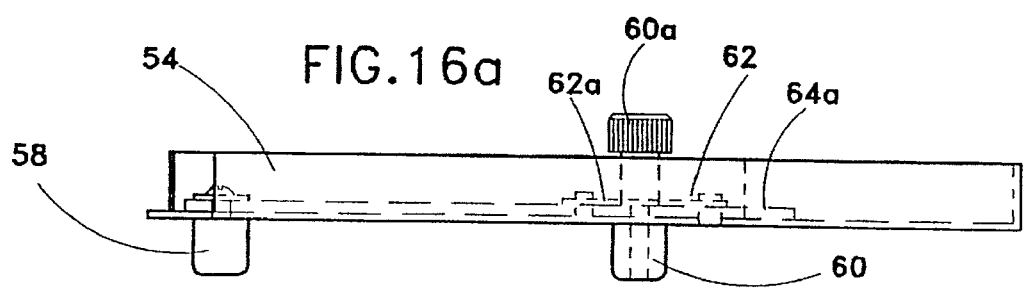
FIG. 16a is a side view of the mitre fence.

As illustrated in FIGS. 2, 16 and 16a, apparatus 10 includes an adjustable mitre fence 54, which is removably mountable to base 48 by means of snug engagement in holes 56 of both downward protruding dowel 58 and downward protruding dowel 60. Dowel 60 provides a mounting base for threaded knob 60a. Knob 60a releasably secures mitre fence 54 at a desired horizontal angular position relative to base 48. Mitre fence 54 includes a detent pin 62 and a detent pin spring 62a mounted on a mitre pivot arm 64. Mitre sight wire 64a is included for positive adjusting of the mitre fence angle into preset detent holes 66, which may be preset at 45 degrees, 22½ degrees and 0 degrees (or 90 degrees) or, if not using the detents, any angle in between, relative to the split fence 50.

Referring now to the FIGS. 1, 6 and 7, the apparatus operates as follows: The hand-held power tool carriage 14 is slid onto support arms 12 so that splines 18 interlock with grooves 16. Carriage 14 slidably mounted on support arms 12 helps keep support arms 12 perpendicular to base 48. Carriage 14 is clamped into place by clamping cam lever 22, thereby releasably selectively positioning carriage 14 along support arms 12. Carriage 14 can be removed from either end of support arms 12 and horizontally rotationally positioned, at 90 degree increments relative to the support arms 12. This allows for crosscutting or ripping with a circular saw, depending on the orientation of carriage 14.

As best seen in FIGS. 1 and 4–7, the apparatus 10 includes rear cylindrical uprights 38 and front cylindrical uprights 40 which fit into the base support clamps 44 for vertically elevating or lowering of the carriage 14, relative to the base 48. The front set of the cylindrical uprights 40 have teeth 40a, which mesh with a pair of pinion gears 42. By turning the elevation knobs 46a, the elevation rod 46, which horizontally traverses underneath base 48 and is journalled in base support clamps 44, causes the pinion gears 42 to elevate or to lower the carriage 14 and the support arms 12 simultaneously, relative to the base 48. The base support clamps 44 include clamping arms 44a which may be tightened around the cylindrical uprights 38 and 40, by turning the clamping handles 44b, thus releasably adjusting the height of support arms 12. This allows for fine adjustments of the support arms 12 to fit down onto an uneven work-piece (not shown) and allows the work-piece to be supported or restrained on at least 3 sides of the work-piece. This reduces the chances of the work-piece kicking up and provides increased safety and accuracy of cutting of the work-piece.

As best seen in FIGS. 2 and 16, the invention also includes an adjustable mitre fence 54, which is adjustably and selectively positionable to various positions on the top of the base 48. Downward protruding dowels 58 and 60 can be positioned on base 48 to thereby releasably mount mitre fence 54 by lifting the mitre fence 54 directly up to remove the dowels from holes 56. Mitre fence 54 may then be repositioned on base 48 to another row of holes 56. The mitre fence 54 has a finger knob 60a to provide positive tightening of arm 64 onto mitre fence 54 at any position of the mitre fence 54 relative to mitre fence incremental gauge 54a. Mitre fence 54 includes a detent pin 62, a detent spring 62a, a mitre pivot arm 64 and a mitre sight wire 64a, for incrementally positioning the mitre fence 54 at any desired angle from 43 degrees to 92 degrees (or –2 degrees), or for releasably selectively positioning mitre fence 54 at preset positions, typically 45 degrees, 22½ degrees and 0 degrees (or 90 degrees) relative to the split fence 50.

Carriage 14 includes a clamping cam 22 to selectively and releasably position carriage 14 along support arms 12. The clamping cam 22 is used whenever the power tools are used in a fixed position on carriage 14. The carriage 14 includes a plurality of elongated holes 24, with recesses 26 on the bottom face 30 to allow the heads of carriage bolts 28 to remain flush with the bottom face 30 of carriage 14. Carriage bolts 28 slide in the elongated holes 24 thus allowing for the clamping of any model of circular saw, router or jigsaw onto carriage 14 by means of clamps 32. The carriage bolts 28 are secured on to the circular saw, router or jigsaw by adjusting the position of clamp arms 32d and cam surfaces 32c so that when cam levers 32a are rotated, cam surfaces 32c bias clamp arms 32d snugly onto the saw, router or jigsaw.

When using a jig-saw, the carriage 14 is fixed along the support arms 12 by actuating clamping cam lever 22. The blade of the jig-saw is positioned so as to extend through the bit receiving hole 14a in the mid portion of the carriage 14. The jigsaw is clamped by the clamps 32 to the carriage 14 with the tool bit directed through the bit receiving hole 68 in the base 48. The carriage 14 and the support arms 12 are then lowered to touch the work-piece, the work-piece is moved towards the jig-saw blade while steering the work-piece, much the same as in using a band saw.

When using a router, the bit is lowered into the bit receiving hole 14a and then clamped by the clamps 32 to the carriage 14. A router may be used either in a fixed position by applying the clamping cam lever 22 or by sliding the router and the carriage 14 along the support arms 12 for cross-routing. Sometimes when the bottom of the router bit is lower than the bottom of the work-piece, the bit should be centered over the bit receiving hole 68 and the carriage 14 and the support arms 12 should be lowered to just touch the top of the work-piece, where the work-piece is moved into the router bit while being held between the carriage's bottom face 30 and the bottom of the support arms 12 and the top of the base 48.

The router mounted on carriage 14 may also be pulled along the support arms 12 with the work-piece stationary for cross-routing. At least the top surface and the bottom surface of the work-piece should be in contact with the apparatus and in many cases the work-piece should and can be held in position from one side by the split fence and on the other side by a piece of material the same, or smaller than the thickness of the work-piece and clamped next to the work-piece at the same time being held between the carriage's bottom face 30, the bottom of the support arms 12 and the top of the base 48. Wherever the split fence cannot be used in guiding the work-piece, then the user may clamp a length of material in the appropriate position next to the work-piece.

The apparatus also includes a removable adjustable carriage guide attachment 36 with an adjustable guide cam lock 36a, for use as a ripping and routing guide, used when the work-piece is too large to manipulate on to the apparatus.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A cantilevered hand-held power tool attachment device for releasably mounting hand-held power tools in an elevated upright position over a base comprising:

a base;

mounted to said base, means for selectively adjustably elevating and lowering a pair of laterally opposed cantilevered support arms extending longitudinally over said base;

a power tool carriage slidably mounted between said pair of laterally opposed cantilevered support arms and selectively slidably lockably positionable in a longitudinal direction along said pair of laterally opposed cantilever support arms, said power tool carriage adapted to releasably lockably mate a hand-held power tool in releasably mountable vertical engagement thereon, wherein said means for selectively adjustably elevating and lowering said pair of laterally opposed cantilevered support arms comprises first and second laterally opposed pairs of vertical members, said first and second laterally opposed pairs of vertical members spaced apart in said longitudinal direction at a first end of said pair of laterally opposed cantilevered support arms and rigidly mounted to and extending downwards from said pair of laterally opposed cantilevered support arms, said first and second laterally opposed pairs of vertical members journalled in corresponding first and second pairs of laterally opposed apertures in said base at a first side of said base whereby said pair of laterally opposed cantilevered support arms are cantilevered over said base, said first laterally opposed pair of vertical members having means for selectively adjustable incremental raising and lowering of said pair of laterally opposed cantilevered support arms co-operating between said first laterally opposed pair of vertical members and said base.

2. The device of claim 1 wherein said means for incrementally raising and lowering said pair of laterally opposed cantilevered support arms co-operating between said first laterally opposed pair of vertical members and said base comprises a linear array of vertical teeth extending vertically on corresponding quadrants on said first laterally opposed pair of vertical members, said vertical teeth in mating engagement with selectively adjustable gear means, said selectively adjustable gear means co-operating with means for selectively rotating said gear so as to incrementally raise or lower said first laterally opposed pair of vertical members.

3. The device of claim 1 wherein said base further comprises an opposed pair of clamps rigidly mounted to said base for releasably clamping said second laterally opposed pair of vertical members relative to said base.

4. The device of claim 1 wherein said power tool carriage comprises a mounting plate having a plurality of elongated slots co-operating with a plurality of selectively adjustable tool clamps for releasably, lockably mating said hand held power tool in releasably mountable vertical engagement on said mounting plate.

5. The device of claim 4 wherein said tool clamps comprise bolt means slidably journalled generally vertically upwards through said elongated slots, a head of said bolt means co-operating in flush slidable engagement with a corresponding recess extending along said elongated slots, a clamping member having an aperture through which may be journalled said bolt means when said clamping member is positioned for clamping on a top surface of said mounting plate, selectively rotatable cam means rotatably mounted on said bolt means, said cam means having a cam surface for engaging a top surface of said clamping member and urging said clamping member downwards towards said top surface of said mounting plate when said cam means is rotated so as to engage said cam surface with said upper surface of said clamping member.

6. The device of claim 5 wherein said selectively rotatable cam means is selectively rotatable by a pivotable lever rigidly connected to, and extended from, said cam means, and pivotably mounted on said bolt means.

7. The device of claim 5 wherein said cam member is curved so as to form a concave clamping surface facing said top surface of said mounting plate.

8. The device of claim 7 wherein said clamping member has a scalloped top surface for mating engagement of said cam surface selectively within a scallop of said scalloped surface.

9. The device of claim 8 wherein said power tool carriage further comprises carriage clamp selectively adjustable levers for selectively positioning said power tool carriage in releasably lockable engagement with said pair of laterally opposed cantilevered support arms.

10. The device of claim 9 wherein said mounting plate includes a sighting aperture, said sighting aperture having a wire sight.

11. The device of claim 10 wherein said wire sight is adjustably aligned with the cutting axis of a blade of said power tool clamped on said mounting plate.

12. The device of claim 1 wherein said base comprises a flat base table adapted to receive in releasable mounting engagement thereon a selectively adjustable mitre fence.

13. The device of claim 12 wherein said mitre fence is releasably mountable onto said base table by means of dowels rigidly mounted to, and extending downwards from, said mitre fence, said dowels for snug releasable mating engagement in apertures in said base table.

14. The device of claim 12 wherein said base table further comprises a two-piece selectively positionable split fence, releasably mountable on said base table.

15. The device of claim 14 wherein the underside of said base table is recessed to facilitate clamping of said base table onto an existing work table.

16. A cantilevered hand-held power tool attachment device for releasably mounting hand-held power tools in an elevated upright position over a base comprising:

a base;

mounted to said base, means for selectively adjustably elevating and lowering a pair of laterally opposed cantilevered support arms extending longitudinally over said base;

each of said cantilevered support arms of said pair of laterally opposed cantilevered support arms having a longitudinal groove extending along substantially the length of its surface directly laterally opposed to the opposed cantilevered support arm;

a power tool carriage slidably mounted between said pair of laterally opposed cantilevered support arms and selectively slidably lockably positionable in a longitudinal direction along said pair of laterally opposed cantilever support arms, said power tool carriage having at least one pair of opposed splines along the edges thereof for slidable mating engagement in said longitudinal grooves;

said power tool carriage adapted to releasably lockably mate a hand-held power tool in releasably mountable vertical engagement thereon.

17. The device of claim 16 wherein said means for selectively adjustably elevating and lowering said pair of laterally opposed cantilevered support arms comprises first and second laterally opposed pairs of vertical members, said first and second laterally opposed pairs of vertical members spaced apart in said longitudinal direction at a first end of said pair of laterally opposed cantilevered support arms and rigidly mounted to and extending downwards from said pair of laterally opposed cantilevered support arms, said first and second laterally opposed pairs of vertical members journalled in corresponding first and second pairs of laterally opposed apertures in said base at a first side of said base whereby said pair of laterally opposed cantilevered support arms are cantilevered over said base, said first laterally opposed pair of vertical members having means for selectively adjustable incremental raising and lowering of said pair of laterally opposed cantilevered support arms co-operating between said first laterally opposed pair of vertical members and said base.

18. The device of claim 17 wherein said means for incrementally raising and lowering said pair of laterally opposed cantilevered support arms co-operating between said first laterally opposed pair of vertical members and said base comprises a linear array of vertical teeth extending vertically on corresponding quadrants on said first laterally opposed pair of vertical members, said vertical teeth in mating engagement with selectively adjustable gear means, said selectively adjustable gear means co-operating with means for selectively turning said gear so as to incrementally raise or lower said first laterally opposed pair of vertical members.

19. The device of claim 17 wherein said base further comprises an opposed pair of clamps rigidly mounted to said base for releasably clamping said second laterally opposed pair of vertical members relative to said base.

20. The device of claim 16 wherein said power tool carriage comprises a mounting plate having a plurality of elongated slots co-operating with a plurality of selectively adjustable tool clamps for releasably, lockably mating said hand held power tool in releasably mountable vertical engagement on said mounting plate.

21. The device of claim 20 wherein said tool clamps comprise bolt means slidably journalled generally vertically upwards through said elongated slots, a head of said bolt means co-operating in flush slidable engagement with a corresponding recess extending along said elongated slots,
   a clamping member having an aperture through which may be journalled said bolt means when said clamping member is positioned for clamping on a top surface of said mounting plate,
   selectively rotatable cam means rotatably mounted on said bolt means, said cam means having a cam surface for engaging a top surface of said clamping member and urging said clamping member downwards towards said top surface of said mounting plate when said cam means is rotated so as to engage said cam surface with said upper surface of said clamping member.

22. The device of claim 21 wherein said selectively rotatable cam means is selectively rotatable by a pivotable lever rigidly connected to, and extended from, said cam means, and pivotably mounted on said bolt means.

23. The device of claim 21 wherein said cam member is curved so as to form a concave clamping surface facing said top surface of said mounting plate.

24. The device of claim 23 wherein said clamping member has a scalloped top surface for mating engagement of said cam surface selectively within a scallop of said scalloped surface.

25. The device of claim 24 wherein said power tool carriage further comprises carriage clamp selectively adjustable levers for selectively positioning said power tool carriage in releasably lockable engagement with said pair of laterally opposed cantilevered support arms.

26. The device of claim 25 wherein said mounting plate comprises a sighting aperture, said sighting aperture having a wire sight.

27. The device of claim 26 wherein said wire sight is aligned with the cutting access of a blade of said power tool clamped on said mounting plate.

28. The device of claim 16 wherein said base comprises a flat base table adapted to receive in releasable mounting engagement thereon a selectively adjustable mitre fence.

29. The device of claim 28 wherein said mitre fence is releasably mountable onto said base table by means of dowels rigidly mounted to, and extending downwards from, said mitre fence, said dowels for snug releasable mating engagement in apertures in said base table.

30. The device of claim 28 wherein said base table further comprises a two-piece selectively positionable split fence, releasably mountable on said base table.

31. The device of claim 30 wherein the underside of said base table is recessed to facilitate clamping of said base table onto an existing work table.

* * * * *